United States Patent [19]

Taylor et al.

[11] Patent Number: 5,294,241
[45] Date of Patent: Mar. 15, 1994

[54] METHOD FOR MAKING GLASS TO METAL SEALS

[75] Inventors: William J. Taylor, Anoka; Joseph F. Lessar, Coon Rapids; Weiss J. Douglas, Plymouth; Charles N. Wilson, Maple Grove, all of Minn.

[73] Assignee: Medtronic, Inc., Minneapolis, Minn.

[21] Appl. No.: 19,946

[22] Filed: Feb. 19, 1993

[51] Int. Cl.$^5$ .............................................. C03C 27/04
[52] U.S. Cl. ................... 65/59.31; 65/59.1; 65/59.34; 228/903
[58] Field of Search .............. 65/36, 59.1, 32.2, 59.31, 65/59.34, 59.35, 59.4; 228/903

[56] References Cited

U.S. PATENT DOCUMENTS

| | | | |
|---|---|---|---|
| 4,236,045 | 11/1980 | Van den Plas | 65/59.22 |
| 4,421,947 | 12/1983 | Kyle | 65/59.34 |
| 4,888,037 | 12/1989 | Bandyopadhyay | 65/59.2 |
| 5,093,710 | 3/1992 | Higuchi | 357/71 |
| 5,104,755 | 4/1992 | Taylor | 429/181 |
| 5,128,080 | 9/1992 | Van Thyne | 313/345 |

FOREIGN PATENT DOCUMENTS 0311308 9/1988 European Pat. Off. .

Primary Examiner—W. Gary Jones
Assistant Examiner—John Hoffmann
Attorney, Agent, or Firm—Daniel W. Latham; Harold R. Patton

[57] ABSTRACT

A method for making a seal between a sealing glass and titanium by forming a nitride layer on the titanium and then sealing the glass to the nitrided titanium. The formation of the nitride layer can be accomplished by the steps of placing the titanium in a substantially oxygen-free atmosphere comprising a major amount of an inert gas and a minor amount of nitrogen and heating the titanium in that atmosphere to a temperature of at least 300° C. The method allows for the formation of the nitride layer and the glass seal in a single operation. The method works well in the manufacture of feedthroughs with conventional processing equipment.

10 Claims, 1 Drawing Sheet

METHOD FOR MAKING GLASS TO METAL SEALS

BACKGROUND OF THE INVENTION

The present invention relates to methods for making glass to metal seals for electrical feedthroughs and the like and especially for electrical feedthroughs in implantable medical devices.

It is well known in the glass sealing art to make hermetically sealed electronic components such as electrical feedthroughs. A typical feedthrough consists of an external metal part (a frame or ferrule) into which preformed solid or sintered glass part is sealed. Within the glass part, one or more metal leads (pins) are sealed. Since the reliability of critical implantable medical devices depend on hermetic sealing of various components, the integrity of the glass to metal seals used in battery components and the seal between the internal electrical components and the human body is of paramount importance.

In many implantable medical devices, titanium is used due to its superior corrosion resistance and biocompatability. However, for many glass-metal seals where titanium is a metal component, the glass compositions fail to readily wet the titanium surface and therefore the adhesion of the glass to the metal is compromised. In matched seals, the coefficient of thermal expansion of the glass and metal are similar so that good chemical bonding between the glass and titanium is necessary in order to provide an adequate seal. Thus, for matched seal configurations a poor bond between the titanium and the glass can be fatal to the integrity of the seal. In compression seals where the coefficients of thermal expansion of the various parts is mismatched, sealing is accomplished by establishing a compressive force between the components. However, even for compression seals, the wetting of the glass on the titanium and its adhesion to the titanium can improve the strength and reliability of the seal.

In order to improve the wetting and adhesion of glass and metal, oxide layers are typically formed on the metal in order to change the surface chemistry of the metal. For example, in European Patent Application 0 311 308, a method is disclosed for hermetically sealing a glass to a metal in which an oxide layer is formed on the metal in a one-step process by carrying out the sealing process in an atmosphere which includes an atmosphere of an inert gas such as nitrogen or argon together with water vapor and hydrogen. Also, in Brow et al., *Reactions and Bonding Between Glasses and Titanium*, Sandia National Laboratories SAND-87-0541C, hermetic seals between titanium and various candidate glasses are disclosed along with the suggestion that oxidation or nitridation may have an effect on seal properties and interfacial chemistries.

It is therefore an object of the present invention to provide a glass to titanium seal having superior sealing properties.

It is also an object of the present invention to provide a method for making a superior glass to titanium seal which can be performed with conventional sealing techniques and equipment.

SUMMARY OF THE INVENTION

These and other objects are accomplished by the present invention. We have discovered a method for making a seal between a sealing glass and titanium by forming a nitride layer on the titanium and then sealing the glass to the nitrided titanium. The formation of the nitride layer can be accomplished by the steps of placing the titanium in a substantially oxygen-free atmosphere comprising nitrogen and heating the titanium in that atmosphere to a temperature of at least about 300° C. Preferably, in a single step process in which the glass seal is formed at the same time as the formation of the nitride layer, the nitrogen is a minor part of an inert gas atmosphere in which the nitrogen comprises about 20 ppm to 10000 ppm of the atmosphere. The balance of the atmosphere can be argon gas.

When the method is applied to a feedthrough with a titanium ferrule, the feedthrough can be made by conventionally arranging feedthrough components including a pin, a glass preform and the titanium ferrule on a fixture and then placing the feedthrough components and fixture into a furnace containing the inert gas and nitrogen. The feedthrough components are then heated in the gas mixture to a temperature at which the glass melts and wets the titanium ferrule. Thus, only a single step is required to both make the nitride layer and to melt the glass into sealing engagement. In order to prevent oxide formation on the ferrule, the oxygen content of the atmosphere is kept below about 100 ppm. The temperature at which the components are heated can vary widely depending on the glass to be used. For example, with lead-based glasses, the temperature could be about 550° C. and with boroaluminosilicate glasses the temperature could be about 1035° C.

Since the sealing qualities of the titanium are substantially improved by the nitriding process, a wide variety of glass can be used to make matched or compression seals. For example, lead borosilicate glass, borosilicate glass, and boroaluminosilicate glass could be used. The method works well with conventional processing equipment so that the furnace used can be a conventional multi-zone belt furnace or batch furnace and conventional graphite fixtures can be used.

DETAILED DESCRIPTION OF THE INVENTION

Figure 1:
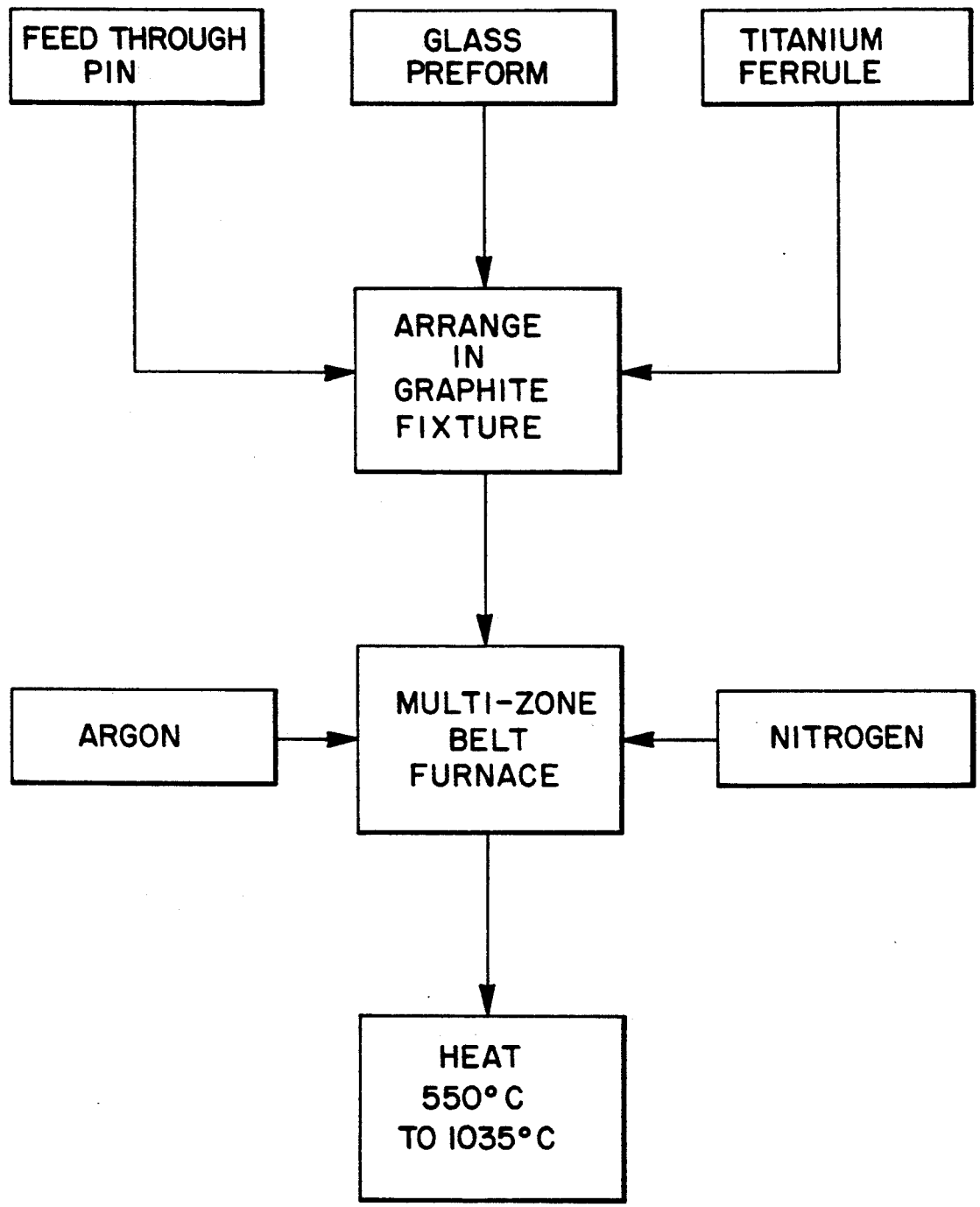
FIG. 1 is a flow diagram of a preferred embodiment of the method of the present invention.

In the present invention, a seal is made between a sealing glass and titanium by forming a nitride layer on the titanium and then sealing the glass to the nitrided titanium. The nitride layer can be provided by any number of well known methods in which nitrogen is brought into contact with titanium under conditions which will promote the formation of titanium nitride. Therefore, physical deposition methods such as reactive sputtered coating could be used. However, the simple expedient of heating the titanium object to be sealed in the presence of nitrogen or nitrogen-containing compounds to effect a chemical change in the surface is preferred. Titanium can therefore be placed in a substantially oxygen-free atmosphere and heated in the presence of nitrogen to form the desired nitride layer. The titanium is heated to at least about 300° C. Preferably, the temperature is at least 500° C. in order to provide a faster reaction rate to speed the overall process. The formation of titanium nitride can be confirmed by the presence of the characteristic yellow color of titanium nitride on the surface of the titanium. In a preferred embodiment in which the glass seal is formed in the same operation as the nitride layer, the nitrogen is preferably only a minor portion of the atmosphere in order to prevent undesirable hardening of the titanium. In such an embodiment, the carrier for the nitrogen can be an inert gas such as argon or helium. The amount of nitrogen in the inert gas/nitrogen atmosphere is then preferably in the range of about 20 ppm to 10000 ppm. Nitrogen levels above about 10000 ppm can be undesirable due to the potential for undesirable hardening of the titanium and can provide a nitride layer that is too thick for optimum glass-to-metal adhesion. Nitrogen levels below about 20 ppm may be ineffective in producing the desired nitride layer. Most preferably, the nitrogen content is about 500 ppm in order to avoid excessive processing time for the completion of the reaction. At 500 ppm nitrogen and a temperature of 500° C., satisfactory nitrodization can be accomplished in about 10-20 minutes.

Preferably, the oxygen content of the nitrogen-containing atmosphere is less than about 100 ppm in order to prevent the formation of titanium oxide on the surface of the titanium. Commercially available nitrogen and argon gases are suitable for use in the present method since they typically can be provided with less than about 10 ppm of water and less than about 15 ppm $O_2$.

The titanium employed need not be pure titanium, commercially available titanium alloys which include aluminum, tin or zirconium and minor amounts of vanadium, molybdenum, tantalum or niobium can be used. A preferred alloy for feedthrough ferrules in implantable medical devices is Ti-6Al-4V due to its known stability in the presence of body fluids as well as its high grain transition temperature. Preparation of the surface of the titanium prior to the formation of the titanium nitride layer can be accomplished by methods which are well known by those skilled in the art. For example, titanium feedthrough ferrules may first be degreased by (1) washing with a surfactant, (2) rinsing in deionized water, (3) rinsing in isopropyl alcohol, and (4) drying at 110° C. The degreased ferrules can then be acid etched in a solution of 87 parts water, 10 parts nitric acid and 3 parts hydrofluoric acid and again rinsed with water, isopropyl alcohol and dried. The resulting ferrules are then ready for treatment to provide the titanium nitride layer according to the present invention.

The method of the present invention can be practiced with a wide variety of glasses including lead borosilicate glass, borosilicate glass, and boroaluminosilicate glass. The glass is heated in contact with the nitrided titanium surface until the glass melts and wets the nitrided titanium. The temperature required to melt the glass depends, of course, on the melting temperature of the particular glass. For example, with lead-based glasses, the temperature could be about 550° C. and with boroaluminosilicate glasses the temperature could be about 1035° C. When cooled, the desired interfacial chemical bond between the titanium, titanium nitride and glass is established. Heating of the glass can be accomplished in conventional furnaces which are capable of heating the glass in an inert atmosphere. Again, the atmosphere should be substantially free of oxygen since it would be undesirable to replace the titanium nitride surface with a titanium oxide surface during the glassing procedure.

Since the glassing procedure utilizes temperatures within the required range for nitride formation, a preferred method includes both nitride formation and glassing of the seal in a single operation. The titanium and glass are placed into a furnace having the desired inert gas/nitrogen atmosphere and are heated to the temperature at which the glass melts. The nitride layer then forms during the heating of the titanium and the glass then melts and wet the newly formed titanium nitride layer.

When the method is applied to a feedthrough with a titanium ferrule, the feedthrough can be made by conventionally arranging feedthrough components including a pin, a glass preform and the titanium ferrule on a fixture and then placing the feedthrough components and fixture into a furnace containing the inert gas/nitrogen atmosphere. The feedthrough components are then heated in the atmosphere to a temperature at which the glass melts and wets the titanium ferrule. Thus, only a single step is required to both make the nitride layer and to melt the glass into sealing engagement. The method of the present invention works well with conventional processing equipment so that the furnace used can be a conventional multi-zone belt furnace or batch furnace and conventional graphite fixtures can be used.

The following examples illustrate several embodiments of the invention.

EXAMPLE 1

Feedthrough ferrules of pure titanium were cleaned by degreasing followed by acid etching. The ferrules were degreased by (1) washing with a surfactant, (2) rinsing in deionized water, (3) rinsing in isopropyl alcohol, and (4) drying at 110° C. The degreased ferrules were then acid etched in a solution of 87 parts water, 10 parts nitric acid and 3 parts hydrofluoric acid and again rinsed with water, isopropyl alcohol and dried. The ferrules were then pre-nitrided by placing them in a pure nitrogen atmosphere in a batch furnace at a temperature of about 500° C. for about 15-20 minutes. The ferrules were then fixtured in a POCO DFP-1 graphite fixture with a niobium or platinum-iridium alloy pin and a preform of Pemco IR-63 glass (composition (%) $SiO_2=46.7$; $B_2O_3=16.6$; $Al_2O_3=4.4$; $ZrO_2=9.9$; $NaO=7.5$; $K_2O=0.4$; $CaO=14.5$). The fixtured components were then placed in a batch furnace in a argon atmosphere at a temperature of 850° C. for a period of 15-20 minutes during which the glass melted into engagement with the nitrided ferrule to form the desired seal. The resulting seal was a slightly compressive seal.

EXAMPLE 2

Feedthrough ferrules of pure titanium were cleaned as set forth in Example 1. The ferrules were then pre-nitrided by placing them in a pure nitrogen atmosphere in a batch furnace at a temperature of about 550° C. for about 10-15 minutes. The pre-nitrided ferrules were then fixtured in a POCO DFP-1 graphite fixture with a platinum-iridium pin and a preform of Corning 7570 glass (composition (%) $SiO_2=3.0$; $B_2O_3=11.0$; $Al_2O_3=11.0$; $PbO=75.0$). The fixtured components were then placed in a belt furnace in a argon atmosphere at a temperature of 550° C. for a period of 10-20 minutes during which the glass melted into engagement with the nitrided ferrule to form the desired seal. The resulting seal was a matched seal.

EXAMPLE 3

Feedthrough ferrules of titanium alloy Ti-6Al-4V were cleaned as set forth in Example 1. The ferrules were then fixtured in a POCO DFP-1 graphite fixture with a platinum-iridium pin and a preform of Corning 7570 glass (composition (%) $SiO_2=3.0$; $B_2O_3=11.0$; $Al_2O_3=11.0$; $PbO=75.0$). The fixtured components were then placed in a belt furnace (Watkins-Johnson 4-zone furnace) in a pure nitrogen atmosphere at a temperature of 550° C. for a period of 10 minutes during which the nitride layer formed and the glass melted into engagement with the nitrided ferrule to form the desired seal. The resulting seal was a matched seal.

EXAMPLE 4

Feedthrough ferrules of titanium alloy Ti-6Al-4V were cleaned as set forth in Example 1. The ferrules were then fixtured in a POCO DFP-1 graphite fixture with a TANTALUM pin and a preform of boroaluminosilicate glass (composition (%) $SiO_2=43.0$; $B_2O_3=20.0$; $Al_2O_3=18.8$; $MgO=7.35$; $CaO=7.44$; $SrO=2.69$; $La_2O_3=0.8$). The fixtured components were then placed in a belt furnace (Watkins-Johnson 4-zone furnace) in an atmosphere of argon with 500 ppm of nitrogen at a temperature of 1035° C. for a period of 10 minutes during which the nitride layer formed and the glass melted into engagement with the nitrided ferrule to form the desired seal. The resulting seal was a highly compressive seal.

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the inventive concepts.

We claim:

1. A method for making a seal between a sealing glass material and a titanium article comprising the steps of:
   a. forming a titanium nitride layer on a surface of the titanium article; and
   b. sealing the glass material to the titanium nitride layer on the surface of the titanium article.

2. The method of claim 1 wherein the titanium nitride layer is formed on the surface of the titanium article by the steps of:
   a. placing the titanium article in a substantially oxygen-free atmosphere comprising nitrogen; and
   b. heating the titanium article in the atmosphere to a temperature of at least 300° C.

3. The method of claim 2 wherein the atmosphere comprises a nitrogen concentration of 20 ppm to 10000 ppm and the balance is an inert gas.

4. A method for making a feedthrough comprising the steps of:
   a. arranging feedthrough components including a pin, a preform of glass material and a titanium ferrule on a fixture;
   b. placing the feedthrough components and fixture into a furnace containing atmosphere comprising a nitrogen concentration of about 20 ppm to 10000 ppm and an inert gas; and
   c. heating the feedthrough components in the atmosphere to a temperature above 300° C. at which the glass material melts and wets the titanium ferrule.

5. The method of claim 4 wherein the temperature to which the feedthrough components are heated is in the range of about 550° C. to about 1035° C.

6. The methods of claims 2 or 4 wherein the oxygen content of the atmosphere is less than 100 ppm.

7. The method of claim 3 or 4 wherein the inert gas is argon.

8. The method of claims 1 or 4 wherein the glass material is selected from the group consisting of lead borosilicate glass, borosilicate glass, and boroaluminosilicate glass.

9. The method of claim 4 wherein the fixture is made from pre-purified graphite.

10. The method of claim 4 wherein the furnace is multi-zone belt furnace.

* * * * *